April 22, 1958 S. B. DISSON ET AL 2,832,065

DIODELESS TRANSFER CIRCUIT

Filed Sept. 28, 1955

INVENTOR.
STANLEY B. DISSON
ALBERT J. MEYERHOFF
BY George Baron
ATTORNEY 2,832,065
Patented Apr. 22, 1958

2,832,065

DIODELESS TRANSFER CIRCUIT

Stanley B. Disson, Broomall, and Albert J. Meyerhoff, Wynnewood, Pa., assignors to Burroughs Corporation, Detroit, Mich., a corporation of Michigan Application September 28, 1955, Serial No. 537,099

7 Claims. (Cl. 340—174)

This invention relates to bistable storage devices utilizing the bistable storage characteristic of magnetic materials.

In computing machines, particularly in those employing the binary notation, some bistable storage devices will comprise a chain or sequence of bistable storage elements wherein a transfer loop couples a bistable element to an adjacent bistable element. Conventional transfer loops are generally employed as shown in Patent No. 2,673,337, issued to R. W. Avery on March 23, 1954, and comprise, generally, a read-out winding associated with one bistable device, a read-in winding associated with an adjacent bistable element and joined to said read-out winding to form a closed loop, and a diode inserted in said closed loop to permit current flow in only one direction through said loop. The diode, by presenting a high impedance to current flow in a given direction in the transfer loop, unloads the core being switched so that most of the switching energy made available by a suitable pulse generator is employed to switch the core rather than be dissipated through elements in the transfer loop.

It has been found that diodes are temperature and moisture sensitive and tend to have a relatively short life, particularly when they are subjected to sudden changes in potential developed across their electrodes. The failure of such diodes will result in the passage of currents in both directions through such transfer loop with the consequent storage of spurious information in the bistable elements.

Accordingly it is an object of the present invention to avoid the use of diodes in the transfer loops coupling two bistable elements.

It is a further object to attain a more reliable transfer loop in electrical circuits wherein bistable ferromagnetic elements are employed as bistable storage elements.

Figure 1:
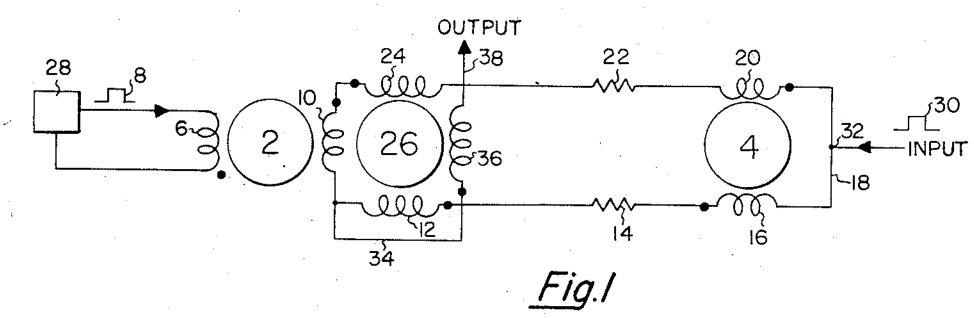
Figure 2:
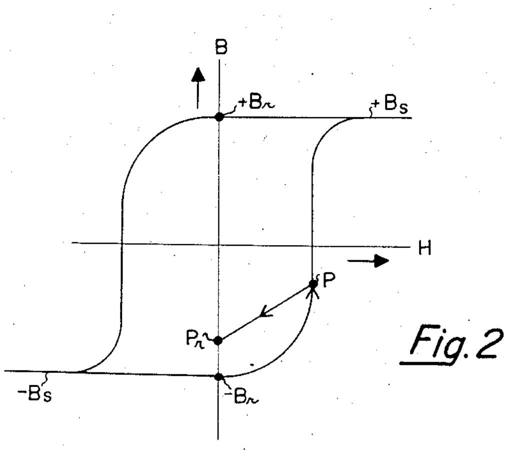
Figure 3:
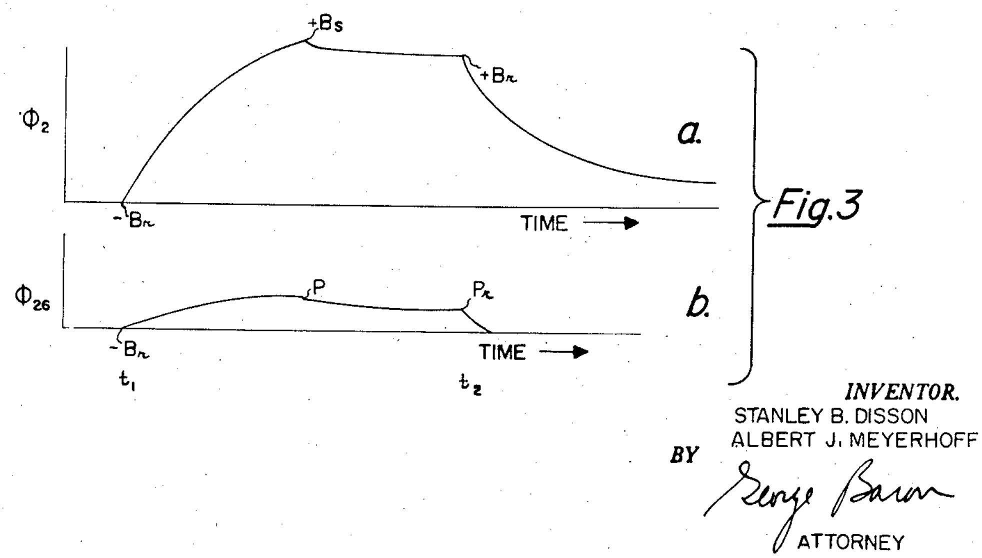

The foregoing and other objects of the invention will become more apparent as the following detailed description of the invention is read in conjunction with the drawings in which:

Figure 1 is a schematic representation of a binary information transfer loop embodying the present invention; and Figure 2 is a substantially rectangular hysteresis loop of the magnetic material which serves as the storage element of information in binary form; and Figure 3 is a flux-time diagram of information storage cores and buffer cores employed in the instant invention; Figure 3*a* refers to a transferee core whereas Figure 3*b* refers to a buffer core.

In Figure 1, the dotted terminal convention is employed as an aid in describing the invention. Current entering the dotted terminal of a winding associated with a given core will tend to switch the core to its "0" state. In Figure 2, the $-B_r$ position of the B–H curve is arbitrarily chosen as the "0" state of the core though it is readily appreciated that one may choose to call such condition of the bistable state the "1" state. Current entering the undotted terminal of the winding associated with the given core will tend to switch the core to its "1" state in accordance with the above noted arbitrary determination of the binary state of the core. The "1" state of the core or similar bistable element corresponds to the $+B_r$ position of the B–H curve of Figure. 2.

In the embodiment of the invention shown in Figure 1, core 2 and core 4 may be two cores in a chain or sequence of cores, such as a shift register circuit employed in computing or logic-solving machines. Information is stored in binary form in core 2 and is transferred, in the course of operating the computing or logic-solving machine, to an adjacent core 4.

Assume that a signal pulse 8 causes current to enter the undotted terminal of winding 6 assocated with core 2 at a time $t_1$ so as to set core 2 to its "1" state. As core 2 is being switched to its "1" state, a voltage pulse is induced in output winding 10 in such a direction so as to oppose the switching of core 2 to its "1" state. Such opposition voltage will cause current flow into the dotted terminal of winding 10, through high impedance winding 12, resistor 14, through the dotted terminal of winding 16, conductor 18, through the dotted terminal of winding 20, through resistor 22, through the undotted terminal of winding 24, and back through the dotted terminal of winding 10.

The induced flow of current through the transfer loop comprising elements 10, 12, 14, 16, 18, 20, 22 and 24 will cause buffer core 26 to switch partially towards its "1" state. Such partial switching is represented by the B–H plot in Figure 2 wherein buffer core 26 traverses its hysteresis curve to point P and drops back to a state of residual magnetism represented by point $P_r$. The number of turns that form windings 12 and 24 exceed the number of turns that form either winding 10 or windings 16 and 20. An exemplary though nowise limiting relationship would allow for windings 12 and 24 to have 40 turns, winding 10 to have 8 turns, and windings 16 and 20 to have 2 turns. Thus buffer core 26, with its associated high impedance windings 12 and 24, serves to unload core 2 while the latter is being switched from its "0" state to its "1" state.

In Figure 3a $\phi_2$ represents the flux in core 2 when core 2 switches at time $t_1$ from its "0" state ($-B_r$) to its "1" state ($+B_r$), the point $+B_s$ representing the flux saturation level of the core. The ordinate $\phi_{26}$ of Figure 3*b* represents a similar curve for buffer core 26 By comparing the two curves it is readily seen that core 2 switches at the same time that buffer core 26 partially switches, but about 80% or more of the energy derived from the input energy source 28 to core 2 has gone into switching core 2 whereas about 20% or less of said input energy is used in the transfer loop in partially switching buffer core 26. Otherwise the low impedance of the windings 16 and 20 of core 4 would dissipate a considerable percentage of the energy.

At a time period $t_2$, an input signal pulse 30 is applied at input terminal 32, said signal pulse causing substantially equal current flow in the direction of the arrow in both the upper and lower branch of the transfer loop coupling cores 2 and 4. The current pulse in the upper branch of the transfer loop passes through winding 20, resistor 22, high impedance winding 24, through the dotted terminal of winding 10, through conductor 34, winding 36 associated with buffer core 26, and out through output lead 38. Current in the lower branch of the transfer loop is traced through the transfer loop via conductor 18, winding 16, resistor 14, winding 12, conductor 34, winding 36 and out through output lead 38. Buffer core 26 is switched to its "0" state very quickly because of the passage of full current into the dotted terminal of winding 36 associated with buffer core 26. The switching time for partially switched buffer core 26 to return from its residual state $P_r$ to its negative saturation state $-B_s$ is about 0.2 to 0.4 microsecond. During this rapid switching of buffer core 26, core 2 is being switched to its "0" state by that part of full current passing into the dotted terminal of winding 10. It is noted that the voltage induced in winding 10 is the result of the change in flux in both cores, 2 and 26, and, in the preferred embodiment, the number of turns on windings 10, 12 and 24 of core 26 are so chosen relative to each other that the voltage induced in winding 10 by the combined flux change in cores 2 and 26 is approximately equal to the sum of the voltages induced in windings 12 and 24 by the flux change in core 26. For example, where winding 10 has 8 turns and windings 12 and 24 each have 40 turn, then $8(d\phi_2/dt+d\phi_{26}/dt)=40\times2(d\phi_{26}/dt)$. Thus, the voltage induced in winding 10 is equal and opposite to the voltages induced in windings 12 and 24, resulting in a cancellation of their effect on the cores in the circuit.

Once partially switched buffer core 26 has been returned to its $-B_s$ condition and held there by current flowing into the dotted terminal of winding 36 for the duration of input voltage pulse 30, the buffer core presents negligible impedance to the flow of current in the transfer loop. Since winding 36 only affects core 26, the number of turns can be the minimum necessary to switch core 26 back to its "0" state. As is seen in Figure 3, buffer core 26 returns to its $-B_s$ condition very quickly. But when core 2 is being switched from its "1" state to its "0" state by current flowing into the dotted terminal of winding 10, a back E. M. F. is induced in winding 10 such as to oppose such switching of core 2 to its "0" state. This back E. M. F. generates a current in the transfer loop that flows around the loop into the undotted terminal of winding 20 and into the undotted terminal of winding 16. Since buffer core 26 is not loading the circuit, having returned to the $-B_s$ condition in a period of about 0.2 to 0.4 microsecond, the current due to the back E. M. F. generated by the switching of core 2 from its "1" state to its "0" state will be utilized in switching core 4 to its "1" state, effecting the transfer of the "1" stored in core 2 into core 4. The switching time of core 2 is of the order of five microseconds; the switching time of core 4 is of the same order as core 2 but core 4 completes its switching before core 2 is completely switched.

When buffer core 26 is being returned to its $-B_s$ condition by the presence of an input voltage pulse at terminal 32, it is desired to dissipate the energy given up to the transfer loop by the buffer core 26 during such return. Dissipative elements such as resistors 14 and 22 of the order of one ohm serve this function of dissipating the energy produced when buffer core 26 returns to its $-B_r$ condition from its residual condition $P_r$. Such resistive elements also serve to complete the switching of core 2 to its "0" state after core 4 has been switched to its "1" state, by supplying core 2 with a load after core 4 has switched.

From the foregoing description, it will be apparent that a novel transfer loop is provided which avoids the use of diodes and their attendant defects in magnetic core circuits yet preserves the desirable functions of such diodes in such magnetic core circuits. Such a novel transfer loop may be used to advantage in logic solving circuits or in computer circuits utilizing magnetic core memory units.

What is claimed is:

1. A transfer circuit for transferring information stored in a bistable magnetic transferor core to another bistable magnetic transferee core, said cores having a substantially square hysteresis characteristic, said transfer circuit comprising a closed loop electrical circuit coupling said cores, means for switching the transferor core from a predetermined state to its other state to initiate current flow through said transfer loop, a third magnetic core magnetically coupled to said closed loop and adapted to be partially switched from its original bistable state toward its other bistable state when the transferor core switches, and transfer means including a pulse source for simultaneously switching said third partially switched core back to its original state and said transferor core back toward its predetermined state, said transfer means including a separate inductance winding associated with said third core for responding to said signal pulse to return said partially switched core to its original bistable state.

2. A transfer circuit for coupling a binary transferor core to a binary transferee core comprising a closed loop including two current flow paths, one path including a first inductance winding coupled to said transferee core as the input winding of said core, a second inductance winding coupled to said transferor core as the output winding of said core, and a third inductance winding possessing the highest impedance of all three windings; a buffer core coupled to said third inductance winding; the second path including an inductance winding similar to said first inductance winding and coupled to said transferee core, and an inductance winding similar to said third impedance winding and coupled to said buffer core; and a separate inductance winding coupled to said buffer core.

3. A transfer circuit for transferring the information stored in a transferor binary core to a transferee binary core comprising an output winding associated with said transferor core; two current flow paths joined to the terminals of said output winding to form a closed loop, one path including a first input winding for the transferee core, a first high impedance inductance winding, and said output winding for said transferor core; a buffer core coupled to said first high impedance inductance winding; the second path including a second input winding for the transferee core, and a second high impedance inductance winding associated with said buffer core; and an inductance winding coupled to said buffer core, the two input windings of the transferee core being so wound as to tend to switch their associated transferee core towards one of its bistable states when current flows around said closed loop, and said two high impedance inductance windings coupled to said buffer core being so wound as to tend to partially switch their associated buffer core towards one of its bistable states when current flows around said closed loop.

4. A transfer circuit for coupling a binary transferror core with a binary transferee core comprising a closed loop including two current flow paths, a buffer binary core associated with said closed loop, one path including a first inductance winding coupled to said transferee core as the input winding of said transferee core, a first high impedance inductance winding for partially switching said buffer binary core from its original bistable state toward its other stable state, and a second inductance winding coupled to the transferror core and serving as an output winding for said transferor core, the second path including an inductance winding similar to the first inductance winding and coupled to the transferee core, a second high impedance inductance winding similar to the first high impedance inductance winding coupled to the buffer core, each pair of windings associated with the transferee core and the buffer core being so oriented with their respective cores so that each pair of windings will tend to switch its respectively associated core to the same binary state when sufficient current traverses the closed loop, and a separate inductance winding coupled to said buffer core and adapted, when conducting current, to return said buffer core to its original bistable state.

5. In combination; a magnetic transferor core, a magnetic transferee core and a magnetic buffer core, each of said cores being capable of assuming one or the other of two stable states of magnetic remanence; an input winding on said transferor core; a winding common to said transferor and buffer cores; a winding on said transferee core having a tap at an intermediate point; first and second windings on said buffer core; a first source of pulse current; means for applying a pulse of current from said first source to said first-core input winding in a direction to switch said first core from said one to said other of its two stable states, thereby to induce in said common winding a voltage for generating a magnetizing force to drive said buffer core from its said one stable state partially toward its said other stable state, said first and second windings on said buffer core exhibiting relatively high impedance during said partial switching and thereby functioning to substantially inhibit transfer of energy to said transferee core; means for connecting in series relation one portion of said tapped transferee-core winding, said first winding on said buffer core and said common winding, thereby to form a first branch path; means for connecting in series relation the other portion of said tapped transferee-core winding and said second winding on said buffer core, thereby to form a second branch path; a third winding on said buffer core connected in series with both said first and second branch paths; a second source of pulse current; means for connecting said second source to drive current from the tap point of said transferee-core winding through said first and second branch paths in parallel and through said buffer-core third winding in series, that portion of the current flowing through said first branch path being effective to switch said transferor core from its said other to its said one state, the current through said buffer-core third winding being effective to return said partially switched buffer core to its said one state in a time interval substantially shorter than that required to complete switching of said transferor core from said other to said one state, the voltage induced in said common winding during switching of said transferor core to said one state being effective, due to the attendant reduction in the impedances of said buffer-core first and second windings following return of said buffer core to said one state, to drive current of sufficient magnitude around a loop comprising said first and second branch paths to switch said transferee core from its one to its other state, whereby binary information placed in said transferor core is transferred to said transferee core.

6. In combination; first, second and third magnetic cores each capable of assuming one or the other of two stable states of magnetic remanence; means for reading information into said first core, said read-in means comprising a first winding and a first source of pulse current for switching said first core from said one state to said other state; a second winding on said first core; a pair of windings on said second core; a pair of windings on said third core; means for connecting said first-core second winding, said pair of second-core windings and said pair of third-core windings in series to form a loop, said first-core second winding functioning, in response to the switching of said first core on read-in, to partially switch said second core by driving current around said loop, the impedance of said pair of second-core windings being relatively high during such partial switching and inhibiting transfer of unwanted information to said third core; an additional winding on said second core having one end connected to said loop at a point located between said first-core second winding and one of said pair of second-core windings; and means for reading information out of said first core, said read-out means including a second source of pulse current connected to said loop at the common junction of said third-core windings to drive current through first and second branches of said loop in parallel and through said second-core additional winding in series, said second-core additional winding functioning, in response to the flow of read-out current therethrough, to return said partially switched second core to a state of substantial flux saturation in a time interval substantially shorter than that required for the read-out current through said first-core second winding to complete the read-out switching of said first core, whereby, following said return of said partially switched second core, the voltage induced by the continued switching of said first core is effective to drive current around said loop in a direction and in a magnitude to switch said third core.

7. A first bistable magnetic core having a read-in winding and a read-out winding, said core being adapted to store information magnetically in response to a read-in signal; a bistable magnetic core for receiving information stored magnetically in said first core; and transfer means effective in response to a read-out signal for reading information out of said first core and into said receiving core, said transfer means being effective to inhibit transfer of information to said receiving core in response to said read-in signal, said transfer means comprising a bistable magnetic buffer core having windings connected in series with windings of said receiving core and with said read-out winding of said first core, said buffer core being adapted to be partially switched in response to the voltage induced in said first-core read-out winding on read-in and to be returned to its original state in response to the read-out signal, said return occurring in a time interval substantially shorter than that required to complete switching of said first core on read-out, whereby the voltage induced in said first-core read-out winding is effective, following said return of said buffer core, to switch said receiving core.

References Cited in the file of this patent

UNITED STATES PATENTS 2,729,807 Paivinen ---------------- Jan. 3, 1956